United States Patent [19]

Blevins et al.

[11] 4,410,021

[45] Oct. 18, 1983

[54] TIRE INFLATION

[75] Inventors: Daniel Blevins; Robert W. Adelman, both of Linden Green, Del.

[73] Assignee: The Crowell Corporation, Newport, Del.

[21] Appl. No.: 264,196

[22] Filed: May 15, 1981

[51] Int. Cl.³ .............................................. B65B 3/04
[52] U.S. Cl. ........................................ 141/95; 141/97
[58] Field of Search .................... 49/68; 137/223, 227; 141/1, 94, 95, 97, 383; 152/415

[56] References Cited

U.S. PATENT DOCUMENTS 3,817,299  6/1974  Koehler .......................... 141/97 X
4,291,500  9/1981  Reckin et al. .......................... 49/68

Primary Examiner—Frederick R. Schmidt
Attorney, Agent, or Firm—Connolly and Hutz

[57] ABSTRACT

Vehicular tires, mounted on wheel rims, are more safely inflated in rugged box enclosing entire tire-and-wheel-rim assembly, using inflating line that penetrates through wall of box, with pressure gauge visible from outside of box. Interlocks can be provided to help assure that box must be closed before inflation can be started, and that box cannot be opened for 5 to 10 minutes after inflation is completed.

6 Claims, 2 Drawing Figures

U.S. Patent

Oct. 18, 1983

4,410,021

TIRE INFLATION

The present invention relates to the inflation of vehicular tires, more particularly to the inflation of tires that can cause considerable damage when something goes wrong.

Among the objects of the present invention is the provision of novel apparatus for relatively safe inflation of tires.

Additional objects of the present invention include novel techniques for relatively safely inflating tires while they are mounted on wheel rims that may have un-noticed defects.

Figure 1:
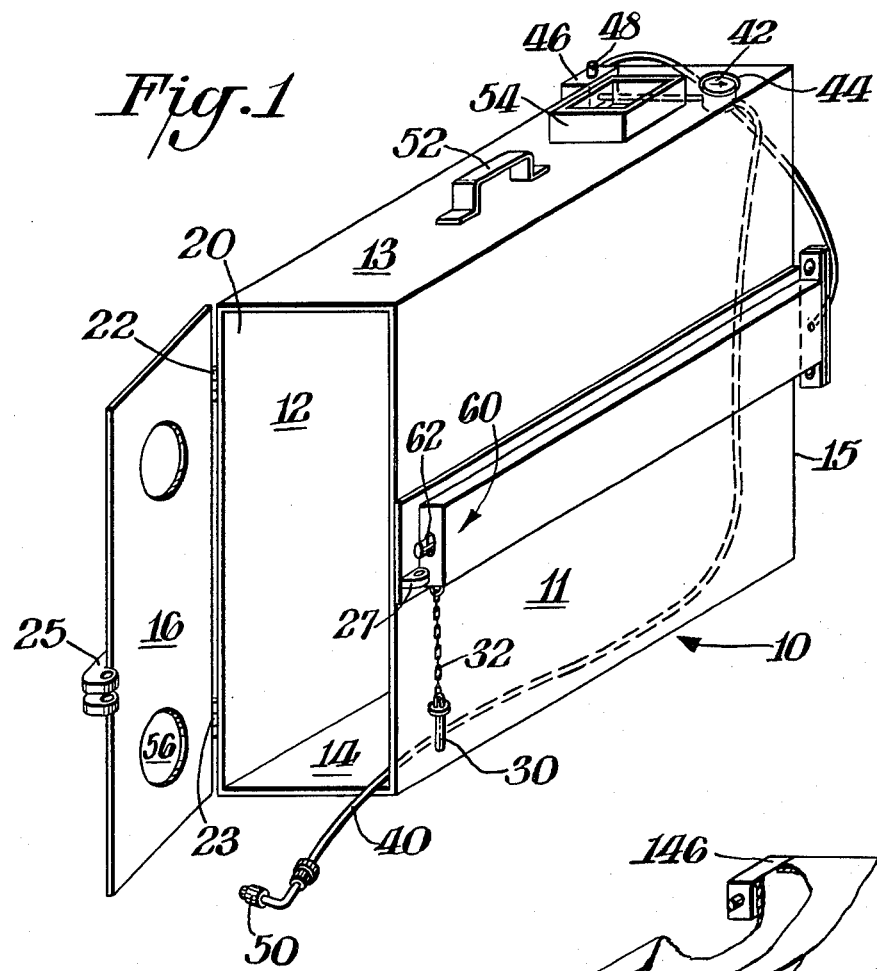
Figure 2:
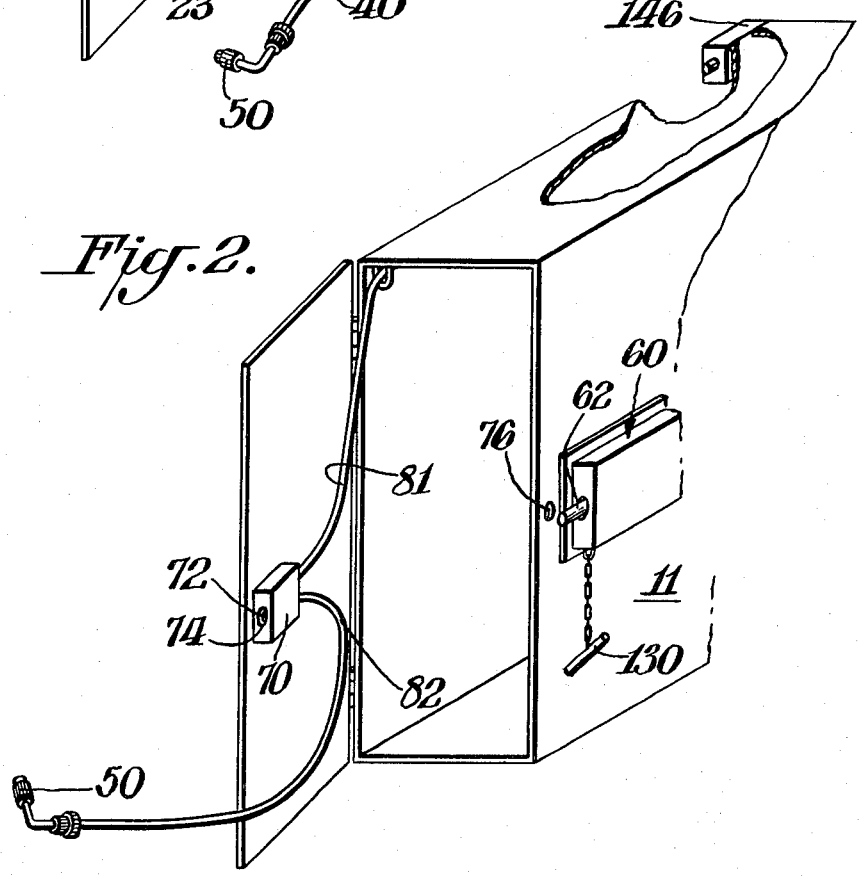

The foregoing as well as still further objects of the present invention will be more fully explained in the following description of several of its exemplifications, reference being made to the accompanying drawings, wherein:

FIG. 1 is an isometric view of an inflating apparatus representative of the present invention; and FIG. 2 is a detail view of a modified construction typical of the present invention.

According to the pesent invention, an apparatus for relatively safely inflating pneumatic tires on vehicular wheel rims, comprises a box that receives a tire-carrying wheel rim, the box having walls surrounding all sides, top and bottom of the tire-carrying wheel rim, the walls being sufficiently strong and securely held to contain all tire and wheel parts in the event the tire explodes, one wall of the box being openable to permit the introduction and the removal of the tire-carrying wheel rim, a flexible air conduit within the box having an outlet connector that can be clamped to a tire valve stem, the air conduit having linking means penetrating through a wall of the box to a valved supply line outside the box, and a pressure indicator visible from outside the box and connected to the flexible air conduit to indicate the pressure in the tire.

The box is conveniently made of ¼ inch thick steel plates welded together, although thicker plates can also be used. It is also helpful for the box not to be airtight but to contain leak gaps that permit the harmless escape of air from the box, in the event a tire in the box explodes. A total leakage through at least about 20 square inches effective leak crosssection is preferred.

Turning now to the drawings, FIG. 1 shows a box 10 made of steel plates 11, 12, 13, 14, 15 and 16, each about ¼ inch thick. Side plates 11, 12 are welded to top and bottom plates 13, 14, and to a rear plate 15 to form an open box large enough to receive a wheel-rim-mounted truck tire. The interior of this box can be 4 feet high, 4 feet deep and about 14 inches wide, so that most truck tires can be easily rolled in through its open mouth 20. Truck tires are the type of tire most likely to explode, as for example because of a failure of the wheel rim on which they are being inflated.

Mouth 20 can then be closed by door plate 16, which is shown pivotally mounted on hinges 22, 23 securely fitted to plate 16 and to side plate 12. The door plate also carries a forked pair of rings 25 that become aligned with a pintle ring 27 welded to plate 11, when the door is closed. The door can then be locked in closed position by inserting a pintle pin 30 downwardly through the aligned rings. Pin 30 is shown as carried by a chain 32 anchored to plate 11, so that it does not get lost.

Within box 10 is a flexible compressed air conduit 40 of the type used to inflate tires. This conduit leads to a pressure gauge 42 mounted against the inner surface of plate 15 but having its face exposed through an opening 44 cut in plate 13. The pressure gauge leads in turn to a control valve 46, by means of a short length of pipe, not shown, that penetrates through a hole in plate 12. A compressed air supply line runs from valve 46 to a compressor or other source of compressed air, and a control button 48 is shown on control valve 46 to turn on and off the flow of compressed air to conduit 40. That conduit can be fitted with a clamp-on fitting 50 that removably clamps onto a tire valve stem to make an air-tight connection to the interior of the tire.

Box 10 is also shown as having a lifting strap 52 welded to the top of plate 13 so that the box can be conveniently lifted and lowered to move it to any desired location. Also an open container 54 can be secured to plate 13 or any of the adjoining plates 11, 12 or 15, to hold tire lubricant, or spare fittings 50 or the like, that may be helpful for use when mounting or inflating a tire.

Air conduit 40 can desirably be made relatively short in length, so that it does not have a long projection that must be stuffed into the box with a tire and wheel assembly, and there is accordingly less danger of the conduit becoming pinched or kinked. Also a short conduit projection makes it easier to first roll a wheel and tire assembly part way into the box, then clamp the conduit to the tire valve stem, and finally roll the wheel and tire assembly with the conduit attached, all the way into the box. The door panel can then be closed, pinned, and the tire inflated.

In addition it becomes difficult or impossible to mount a short conduit 40 onto a tire valve stem unless the tire is partly rolled into the box.

Door panel 16 need not be closely fitted with respect to the mouth of the box. A gap of 1/16 inch all around that panel is actually helpful in that it permits the harmless escape of compressed air in the event a tire bursts while in the box. One or more openings 56 can also or alternatively be provided in the cover panel to permit further air escape, if desired.

Some tire explosions have been reported as taking place several minutes after completing inflation. It is accordingly desirable to wait five to ten minutes after completing an inflation, before opening the door panel and removing the inflated tire. To assure such a delay, the box can be equipped with an automatic lock that prevents premature opening.

In FIG. 1 a precautionary interlock assembly 60 is welded onto the exterior of side plate 11 and holds an interlock nose 62 above pintle ring 27 and in the path of pin 30 as it is inserted in or removed from pinning engagement with the rings 25 of the door panel. Nose 62 is carried by the piston of an air cylinder that extends through the interior of the interlock assembly to the rear panel 15 where it is connected to receive air from the compressed air supply when valve 46 is activated. Upon such activation the air cylinder will force nose 62 into the blocking position shown, and thus keep a previously inserted pin from being withdrawn.

Valve 46 can be of the type that when it shuts off the delivery of compressed air it automatically bleeds out to the atmosphere the air downstream of the valve. In the FIG. 1 construction valve 46 has two branched donstream lines, one to conduit 40 and the other to precautionary interlock 60. The branch to conduit 40 is fitted with a check valve to prevent the automatic bleeding, but the line to the interlock assembly is permitted to bleed. The bleeding rate is fixed at a value that requires 5 to 10 or more minutes before the interlock cylinder air pressure is low enough to allow nose 62 to be withdrawn or pushed away from pin-blocking position. The pin 30 can then be removed, the door panel opened, and the inflated tire rolled out of the box.

FIG. 2 shows a modified construction in which the interlock also helps assure that the door panel must be closed before inflation can be effected. Here an auxiliary control valve 70 has an actuating button 72 deeply recessed in the interior of guide passageway 74, and located on the door panel so that closing of that panel brings passageway 74 into alignment with a pin-receiving aperture 76 in side panel 11.

Valve 70 has two air lines 81, 82, one going to a main control valve 146 and the other to valve stem clamp 50. When the door panel is closed, interlock nose 62 can be pushed in and pin 130 then inserted through aperture 76 and guide passageway 74. Control button 72 can be strongly spring loaded so that considerable force is needed to cause pin 130 to actuate the valve. Nose 62 can then be pulled out to hold pin 130 in actuating position. Inflation can now be effected, after which the nose 62 can be again pushed out of the way once the time-delayed bleeding is completed.

The air cylinder in interlock 60 can be replaced by a rubber bladder that is inflated by the compressed air and presses against a loosely fitted vertically positioned internal plate on which nose 62 is mounted. The bleed opening need only be about a 5 mil wide hole, when the total volume of air to be bled is about 2 liters. Preferably a wire is inserted through the bleed hole and loosely held there so that it can jiggle and keep the hole from becoming clogged with dust or the like.

Holes 56 can be cut through the bottom plate 14, instead of the door plate, in which event it is helpful to have the box floor a little above the ground, as by welding skid strips or short feet to the outside of the box. Such holes can be covered with heavy wire mesh to keep conduit 40 from getting trapped in them.

In FIG. 2 the main control valve 146 has its actuating button positioned on a vertical face, so that the button is pushed in a horizontal direction to trigger the inflation. This makes it difficult to defeat the need to manually operate the valve, an undesirable technique that could be effected as by placing a weight on its actuating button to hold it down. If desired that button can be located on the under surface of the control valve.

The precautionary interlock can be provided in other ways. Thus electrical micro-switches can be mounted on the door panel of the construction of FIG. 2, one to be actuated when the door panel is closed and another when the pin 130 is moved into door-locking position. These switches can be wired in series with each other and in series with a main electrical switch that starts a compressor which furnishes the compressed air to flexible line 40. That main switch can be located at 146 and can also be separately connected to a solenoid that brings interlock nose 62 into locking position and latches it in that position. A timer is also started when the main switch is disengaged and the timing out of the timer unlatches the solenoid.

Alternatively, the flexible air conduit 40 can include a make-and-break push-pull connector consisting of two separable parts one of which is mounted on the door panel and the other of which is mounted on the outside of panel 11. When the door panel is closed it carries its part of the connector into engagement with the part on panel 11, and in this way establishes the compressed air path to a portion of air conduit 40 that extends through an opening in the door panel and into the interior of the box.

Opening the door panel, then opens the make-and-break connection so that no compressed air can reach the tire valve. The parts of the make-and-break connector can also be arranged to lock together when their interiors are subjected to superatmospheric pressure, to thus lock the door in closed position. This can be effected by making the make-and-break connection between a rubber male connector that expands when its interior is under pressure, and a relatively rigid female connector that receives the male connector and has a tapered internal bore that holds the male connector in place when the male connector is expanded.

A bleed hole can be used to bleed the pressurized air out of the make-and-break connector over the desired time period. A check valve downstream of the make-and-break connector prevents bleeding of the air from the inflated tire.

The boxes of the present invention can be larger or smaller than indicated in the dimensions given above, and can be made to fit any tire.

To prevent misoperation, filters can be installed in the air lines, particularly just upstream of an air cylinder, or upstream of the main valve, to trap dust and other particles and thus keep them from getting into critical places.

Obviously many modifications and variations of the present invention are possible in the light of the above teachings. It is therefore to be understood that within the scope of the appended claims the invention may be practiced otherwise than as specifically described.

What is claimed:

1. An apparatus for relatively safely inflating pneumatic tires on vehicular wheel rims, the apparatus comprising a box that receives a tire-carrying truck wheel rim, the walls being sufficiently strong and securely held to contain all tire and wheel parts in the event the tire or rim explodes, one wall of the box being a door openable to permit the introduction and the removal of the tire-carrying wheel rim, a flexible air conduit within the box and having an outlet connector that can be clamped to a tire valve stem, the air conduit having linking means penetrating through a wall of the box to a valved supply line outside the box, a pressure indicator visible from outside the box and connected to the flexible air conduit to indicate the pressure in the tire, and precautionary interlock means coacting with the door and the air conduit to prevent the flow of air from the valved supply line to the valve stem when the door is not closed but permitting such flow when the door is closed.

2. The apparatus of claim 1, and further including a manually-operated control connected for actuating the tire inflation, the control and the interlock means being at opposite ends of the box.

3. The apparatus of claim 2 in which the manually-operated control is positioned so that it will not be operated by a weight.

4. The apparatus of claim 1 in which the interlock means is inside the box when the box is closed.

5. The apparatus of claim 1 in which the box is dimensioned to closely receive the tire-carrying wheel rim.

6. The apparatus of claim 1 in which the flexible air conduit has a length short enough to require a tire to be partly inserted in the box before the conduit can be connected to the valve stem carried by the tire.

* * * * *